April 21, 1964 P. R. GUMUCIO ETAL 3,129,791
RECTANGULAR BOLTED STORAGE STRUCTURE
Filed Feb. 8, 1960 3 Sheets-Sheet 2

INVENTORS.
Pelayo R. Gumucio
Harold G. Simpson
BY *Thos. E. Scofield*
ATTORNEY.

INVENTORS.
Pelayo R. Gumucio
Harold G. Simpson

BY *Thos. E. Scofield*

ATTORNEY.

# United States Patent Office 3,129,791
Patented Apr. 21, 1964

3,129,791
RECTANGULAR BOLTED STORAGE STRUCTURE
Pelayo R. Gumucio, Blue Springs, and Harold G. Simpson, Raytown, Mo., assignors to Butler Manufacturing Company, Kansas City, Mo., a corporation of Missouri
Filed Feb. 8, 1960, Ser. No. 7,180
5 Claims. (Cl. 189—34)

This invention relates to large prefabricated panel type storage structures of rectangular cross section and refers more particularly to structures of this type for containing and storing grain and other granular materials or commodities.

For reasons of efficiency in utilizing space and ease of interconnecting and partitioning a plurality of enclosures, grain bins or storage tanks of rectangular cross section are in many cases preferred to the conventional cylindrical structures. As a result there have been developed rectangular bins or tanks in which the walls are assembled from prefabricated corrugated panels joined edge to edge and end to end to produce a continuous walled enclosure. It is customary to bolt the panel sections together at the joints. However, in order to stiffen the walls against outward flexure or failure when the structure is filled with grain it has, in the past, been necessary to include ribs or stiffeners running horizontally crosswise of the wall at spaced intervals. Inasmuch as the skin of a practical weight panel is not strong enough to withstand tearing at bolts or other fasteners, and for other reasons also, the strengthening ribs or stiffeners have customarily been fastened to the wall structure by welds.

It has long been recognized that the necessity of incorporating a large number of weld seams during assembly is highly undesirable. The thinness of the metal sheet of which the panels are constructed necessitates a great deal of caution in applying the welding flame. Furthermore, welding as a field erection operation has the shortcoming that it is often difficult in many rural areas to obtain satisfactory artisans, and the problem that the investment in welding equipment is sizeable. Finally, the use of welding equipment involves obvious hazards to the erectors.

It has further been a problem with stiffeners of which we are aware that they must, in order to be effective, project substantially into the interior of the bin, thus providing shelves or horizontally directed surfaces upon which the grain or other commodity tends to pile up. This sometimes creates the problem of bridging as withdrawal from the bottom of the bin takes place and prevents complete removal of the material.

One of the important objects of the present invention is to provide a rectangular bolted panel-type storage structure for the purposes set forth in which the walls are constructed of extremely light gauge metal panels yet are assembled without entailing any welding operations. So far as we are aware, this represents a marked advance over similarly shaped structures presently on the market.

Another object of the invention is to provide a panel type structure of the character described in which the flexure loads on the walls are absorbed and resisted by a novel wall stiffening assembly which is coupled with and made a part of the structure and which requires a minimum of additional material.

Another object of the invention is to provide means of the character described for increasing the strength of the walls, which means has the added advantage of facilitating the interconnection of similarly reinforced walls to provide continuous sub-divided enclosures.

A further object of the invention is to provide novel means for reinforcing and increasing the resistance to flexure of corrugated planar walls.

Still another object of the invention is to provide a rectangular storage bin of the character described which is simple and economical to manufacture, is light in weight and which can be erected speedily by unskilled workmen.

A further object of the invention is to provide a rectangular storage structure in which the interior of the structure is maintained relatively free of inwardly projecting surfaces which interfere with the free downward movement of the stored commodity as it is withdrawn from the structure at the bottom.

Another object of the invention is to provide a storage structure of the character described in which the reinforcing and stiffening assembly provides a mounting base for other components of the structure.

Other and further objects of the invention together with the features of novelty appurtenant thereto will appear in the course of the following description.

In the accompanying drawings which form a part of the specification and are to be read in conjunction therewith and in which like reference numerals indicate like parts in the various views;

FIG. 5 is a view similar to FIG. 4, but of the lower left hand corner as viewed in FIG. 2;

Figure 1:
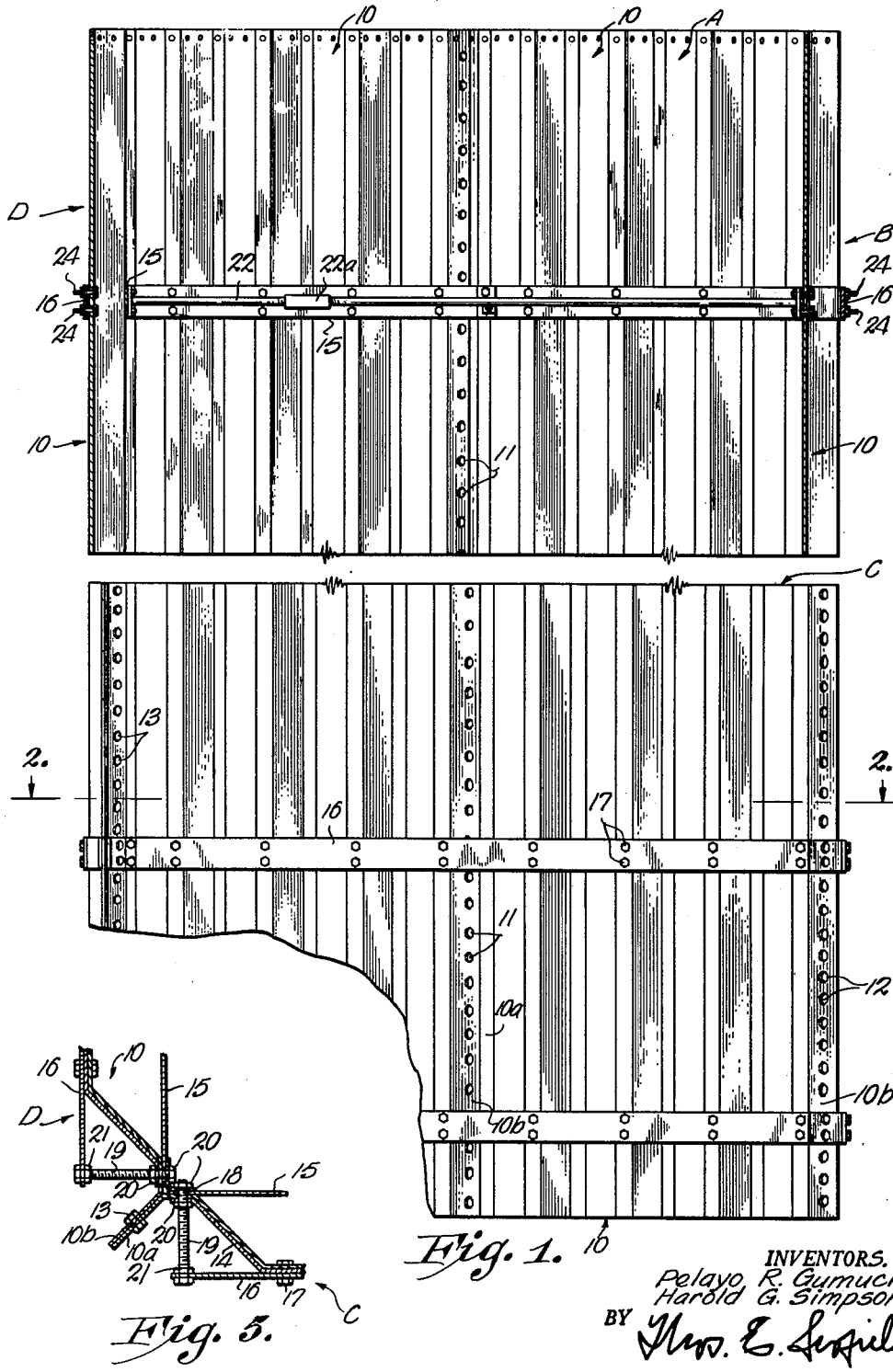
FIG. 1 is a side elevational view of a typical storage structure embodying the invention, the break line indicating length and that portion above the break line being shown in section for purposes of illustration, other parts also being broken away.

Referring now to the drawings, for the purposes of illustrating the invention we have shown a simple grain bin of square cross section having the four vertical walls A, B, C and D. In practice it is customary to support such structures on a concrete or metal structural foundation but inasmuch as the foundation plays no part in the invention it has not been shown.

Figure 2:
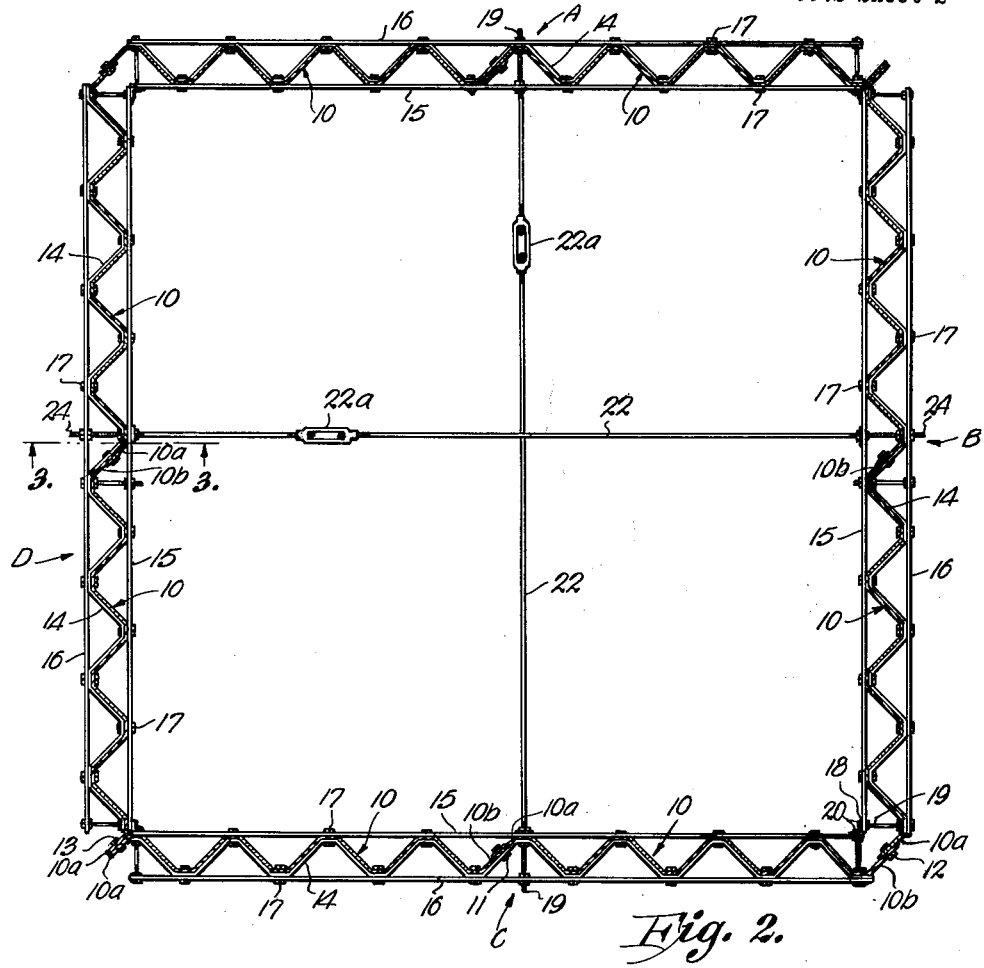
FIG. 2 is a sectional view taken along the line 2—2 of FIG. 1 in the direction of the arrows.
Figure 3:
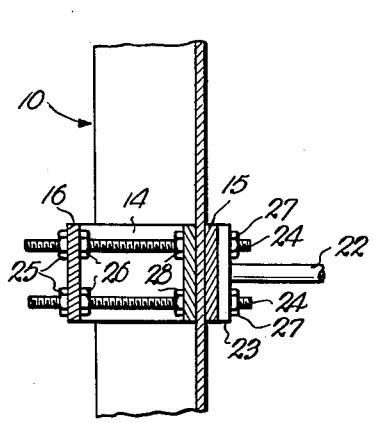
FIG. 3 is a fragmentary section on an enlarged scale taken along the line 3—3 of FIG. 2 in the direction of the arrows.

Each of the walls is assembled from a plurality of similarly shaped and dimensioned rectangular corrugated panels generally indicated by reference numeral 10. In the illustrated embodiment the panels are equal in height with the height of the walls and have a width of one-half the wall width. Each panel is provided with uniform alternating corrugations running vertically. The corrugations are flattened at the apices. The side edges of the panel 10 are oppositely inclined portions 10a and 10b. As best seen in FIG. 2, adjacent panels in each wall section are joined by lapping the extensions 10a and 10b and bolting the joint with a vertical course of bolts 11 (FIG. 1).

The corners of the bin structure likewise are formed by coupling the extensions 10a and 10b of the adjoining wall panels. The form in which the panels are produced results in two types of corner connections, as may again be seen in FIGS. 2, 4 and 5. In one corner arrangement (FIG. 4) the overlapping sections extend toward one another in parallel planes, while in the other (FIG. 5) the extensions project outwardly side by side. In each case, however, the overlapping or abutting sections of the panel are joined together with a vertical row or course of bolts as at 12 and 13, respectively.

The corrugated panels of which the walls are constructed are preferably formed from relatively light gauge metal sheets. Standing by themselves they would be incapable, when assembled into the storage structure without further reinforcement, of providing walls capable of withstanding the internal pressures created when the structure is filled with grain or other material. Consequently, we have provided supplemental stress absorbing assemblies at vertically spaced locations in the structure.

Each reinforcing assembly includes a narrow corrugated metal strip 14, hereinafter called a girt member, extending transversely across the wall. The corrugations of the girt member are similar to those of the panel so that the girt member interfits with the wall with the corrugations thereof nested in the corrugations of the wall panel. The girt member is constructed of heavier metal than the walls, more of which will be said later.

Cooperating with the girt member 14 and disposed respectively on the inside and outside of the wall are elongate plates or cover members 15 and 16. Each plate 15 or 16 is preferably of a width in the vertical direction equal to that of the girt member 14 and has a length sufficient to substantially span the wall. The plates are of substantially greater thickness than the panel skins. For example, the skins are from twelve to eighteen gauge metal, and we employ plates in the range of $3/16$ inch to $1/4$ inch in thickness. We have found that the same thickness material can be advantageously employed for the girt members 14.

The plate members 15 and 16 are firmly secured at regular intervals to the wall panels and girt member by bolts 17 which extend through suitable apertures formed in the flat apices of the corrugations of the girt member and wall panels. It will be observed from FIG. 1 that we prefer to use two bolts at each corrugation. The girt members 14 are coextensive with the outside planes of the walls.

The inside plate members 15 are interconnected, for example, by suitable splice angles 18, bolts 19 and nuts 20. The bolts 19 are long enough to extend through both the plates 15 and 16, a nut 21 serving to tighten the panel 10 and plate 16 against the head of the bolt 19.

The walls of the structure may be further strengthened against outward flexure by the employment of the tie rods 22 extending between opposed walls. The ends of these rods are connected with the wall structure at the reinforcing assemblies. Each rod has at its opposed ends a header 23, the header being secured to the rod by welding or otherwise. This welding, however, is done at the factory in the prefabrication of the assembly. The header is adapted to be butted against the surface of the inside plate 15 and is apertured above and below the rod to receive threaded studs 24. Studs 24 are of a length sufficient to extend from beyond the outside plate 16 to and through the inside plate 15 and through the header. It will be understood that the latter, as well as the intervening portions of the panels 10 and girt members 14, are suitably apertured to pass the studs 24 therethrough.

It will be further observed that studs 24 are threaded over substantially their full length. Nuts 25, 26, 27 and 28 are drawn up tight on the stud against the outside plate 16, girt member 14 and header to complete the connection.

The tie rods 22, once assembled with the structure can be adjusted to proper length by means of the turnbuckles 22a which form a part thereof.

Figure 6:
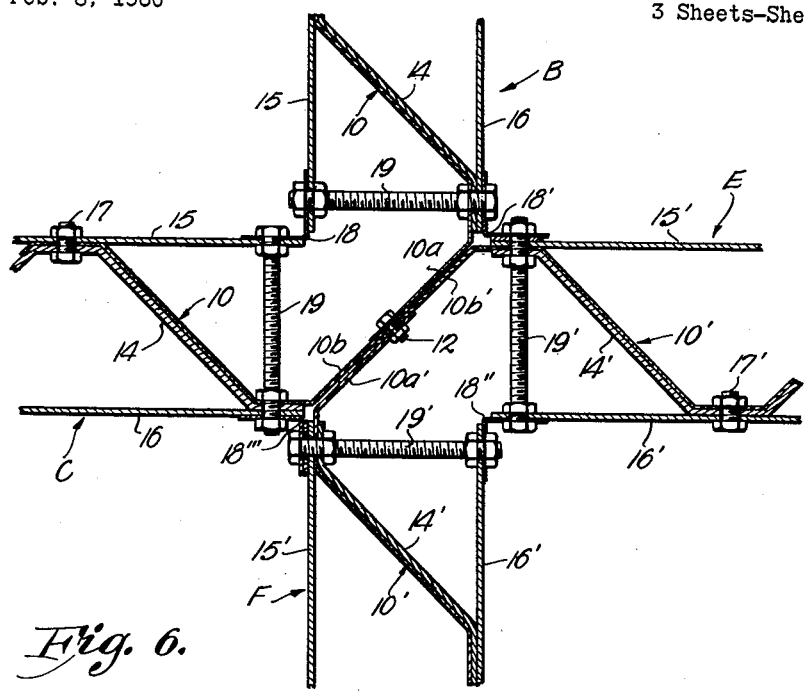
FIG. 6 is a horizontal section through a typical joint formed by interconnecting four walls reinforced with the structure of the present invention.
Figure 7:
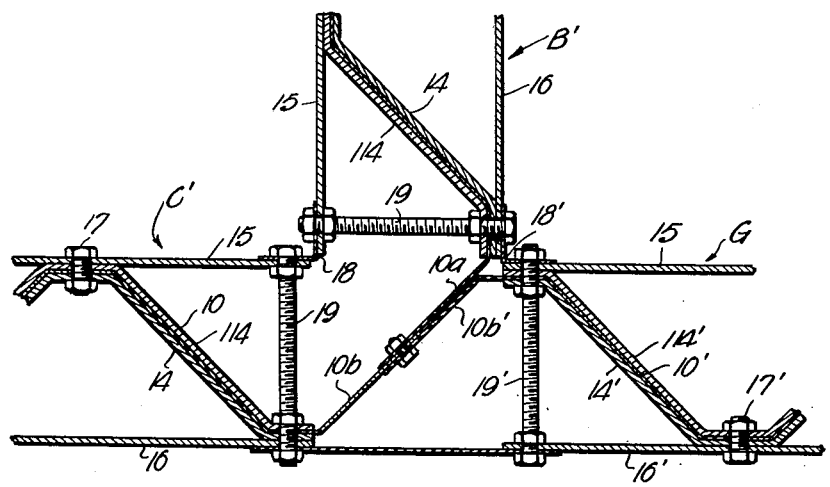
FIG. 7 is a horizontal section through a typical joint formed by interconnecting three walls reinforced with the structure of the present invention.

In FIGS. 6 and 7 we have illustrated typical ways in which walls reinforced in the manner of the present invention can be interconnected to form a multiple enclosure structure.

Figure 4:
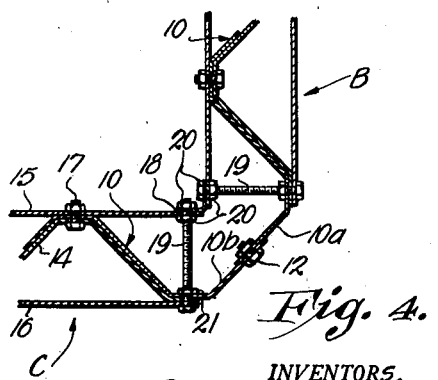
FIG. 4 is an enlarged fragmentary detail on a section line similar to FIG. 2, but showing only the lower right hand corner as viewed in FIG. 2.

Referring first to FIG. 6, this illustrates how two additional walls E and F at right angles with one another, can be edge connected with the corner of FIG. 4 to form continuations of walls B and C. The walls D and E are identical in construction with A and B, each having the panel 10′, corrugated girt member 14′ and spaced plate members 15′ and 16′. The elongate end bolts 19′ are also present on walls E and F. The interconnection is achieved simply by (1) connecting the overlapping panel edge portions 10a′ and 10b′ of walls E and F with similar panel portions 10a and 10b of walls B and C by the bolt course 12; (2) joining the plates 16 of wall B and 15 of wall E by an angle clip 18′; (3) joining plates 16′ of walls E and F by an angle clip 18″; and (4) joining plate 15′ of wall F with plate 16 of wall C by another angle clip 18‴. The resulting joint between the walls is exceptionally strong, and obviously requires nothing more in the way of parts than the additional clips 18′, 18″ and 18‴.

FIG. 7 illustrates a wall structure which differs somewhat from those of the previous figures in that the reinforcing assembly has been made substantially stronger by the addition of another corrugated girt member 114 identical to that earlier described and illustrated at 14. The skin of the panel 10 is sandwiched between the girt members 14 and 114.

The joint shown in FIG. 7 contemplates only the extension of wall C′, as by the wall G. This is accomplished simply by interconnecting the edge portion 10b′ of wall G with the portions 10a and 10b of walls B′ and C′ by the bolt course 12, and joining plate 16 of wall B′ with plate 15′ of wall G through the medium of clip 18′. The gap between plates 16 and 16′ is filled by a splice cover plate 30 apertured to receive bolts 19 and 19′.

From the foregoing it will be evident that we have accomplished all of the objects of the invention as hereinbefore set forth. The interconnected plates and girt members cooperate to absorb and resist the bending stresses imposed on the walls by the internal pressure of the stored commodity. The inside profile of the storage structure remains free from any substantial shelves or obstructions which otherwise might hinder free flow of the material when bottom withdrawal is practiced. The entire structure is assembled by means of bolted connections and consequently it can be erected in the field without requiring the presence of extensive and hard to handle welding equipment. The interconnection of a plurality of walls is achieved with a minimum of parts, and with ease and facility. While we have shown conventional bolts, it will be evident that other types of detachable fasteners and spacers may be used without departing from the principles of the invention.

It will be understood, of course, that structures of any height can be assembled by superposing panels vertically upon one another. The reinforcing assembly disclosed herein can be employed as a splicing structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In an upright rectangular storage structure made up of a plurality of interconnected panels which define the vertical side walls of the structure, the panels having vertical corrugations, the improvement which comprises a reinforcing assembly extending around the structure intermediate the upper and lower ends theref, said reinforcing assembly including horizontally disposed relatively narrow width girt members substantially spanning the respective side walls, each girt member having corrugations similar in shape to and which interfit with the corrugations of the adjacent side walls, inner and outer plate members of substantially the same width as the girt members aligned with and sandwiching therebetween the girt members and portions of the side wall covered by said girt members and respectively contacting the ridges of the corrugations of the wall and girt members, and detachable fastener elements securing the plates, girts and wall to one another at the places where the plate members contact the ridges of the corrugations.

2. In a storage structure as in claim 1, tie rods extending between the opposite side walls of said structure, and means detachably connecting said tie rods at their ends with the reinforcing assembly.

3. In a storage structure as in claim 2, said last mentioned means including a header on each end of a tie rod, bolt means extending through suitable apertures in said header and apertures in said plates, girt and wall portions and fasteners on said bolt means engaging and tying the tie rods to said plate members.

4. A reinforced wall structure comprising a corrugated wall in which the corrugations are parallel and define alternating ridges and valleys on opposite faces of the wall, a relatively narrow girt member extending transversely of the corrugations across the wall intermediate the ends of the wall, said girt member having corrugations similar to and which interfit with the wall corrugations whereby one face of the girt is in substantially continuous contact with a continuous transverse portion of the wall, a pair of flat plate members of substantially the same width as the girt member aligned with said girt member across the wall, the respective plate members in contact with and bearing against the ridges of the corrugations on the opposite faces of the wall, and detachable fastener means securing the respective plates and adjacent portions of the girt and wall together at the corrugation ridges.

5. A reinforced wall structure comprising a wall body made up of corrugated sheet paneling, the corrugations extending parallel with one another and presenting a series of spaced parallel ridges on the opposite faces of the wall, a relatively narrow girt member extending transversely of the corrugations and across the wall body intermediate its ends, said girt member being disposed against one face of the wall body and provided with a corrugated shape similar to the transverse cross section of the wall whereby to provide corrugations which interfit with and seat in the corrugations of the wall, a pair of flat plate members aligned with and disposed on opposite sides of said girt member, said plate members being oriented in spaced parallel planes adjacent the faces of said wall body, one of said plate members contacting ridges on the girt member, the other plate member contacting the ridges on the other face of said wall body, and detachable fastener means securing the plate members with the girt and wall at the areas of contact.

References Cited in the file of this patent

UNITED STATES PATENTS

| | | |
|---|---|---|
| 516,388 | Brendel | Mar. 13, 1894 |
| 529,038 | MacKinney | Nov. 13, 1894 |
| 996,254 | Johnston | June 27, 1911 |
| 1,052,671 | Le Count et al. | Feb. 11, 1913 |
| 1,191,765 | Crumbaugh | July 18, 1916 |
| 1,313,106 | Murphy | Aug. 12, 1919 |
| 2,012,198 | Mazzini | Aug. 20, 1935 |

OTHER REFERENCES

Sheet Metal Worker, September 1943, p. 74.